United States Patent [19]

Lauer

[11] Patent Number: 5,452,322

[45] Date of Patent: Sep. 19, 1995

[54] RECEIVER FOR DIGITAL SIGNALS TRANSMITTED IN THE CODED DIFFERENTIAL MODULATION MODE

[75] Inventor: Vincent Lauer, Nogent, France

[73] Assignee: U.S. Philips Corporation, New York, N.Y.

[21] Appl. No.: 214,890

[22] Filed: Mar. 15, 1994

[30] Foreign Application Priority Data

Mar. 17, 1993 [FR] France ................... 93 03088

[51] Int. Cl.$^6$ ........................................... H04L 27/22
[52] U.S. Cl. ..................... 375/330; 375/283; 371/43
[58] Field of Search .......... 375/27, 84, 56, 39; 371/43; 329/304

[56] References Cited

U.S. PATENT DOCUMENTS

| | | | |
|---|---|---|---|
| 4,675,871 | 6/1987 | Gordon et al. | 371/46 |
| 5,023,889 | 6/1991 | Divsalar et al. | 375/34 |
| 5,191,576 | 3/1993 | Pommier et al. | 375/58 |
| 5,195,108 | 3/1993 | Baum et al. | 375/84 |

FOREIGN PATENT DOCUMENTS

| | | | |
|---|---|---|---|
| 0045260 | 7/1991 | European Pat. Off. | H04L 27/22 |
| 0449146 | 10/1991 | European Pat. Off. | H04L 27/22 |
| 2639495 | 5/1990 | France | H04L 7/00 |

*Primary Examiner*—Stephen Chin
*Assistant Examiner*—T. Ghebretinsae
*Attorney, Agent, or Firm*—Michael E. Marion

[57] ABSTRACT

Receiver (5) for digital signals which comprises a differential decoding circuit deinterleaving and convolution decoding circuit for received digital signals. The differential decoding circuit restores each received symbol to the original phase it had on transmission. This permits the calculation of optimum metrics $$(M_k{}^a, M_k{}^b)$$

which are used by convolution decoding circuit to provide optimum decoding of received symbols.

15 Claims, 1 Drawing Sheet

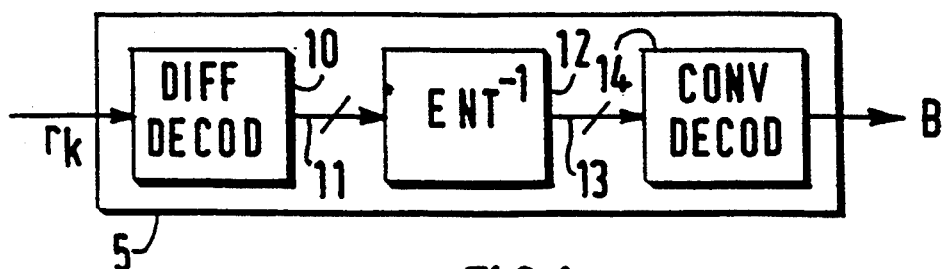
FIG.1
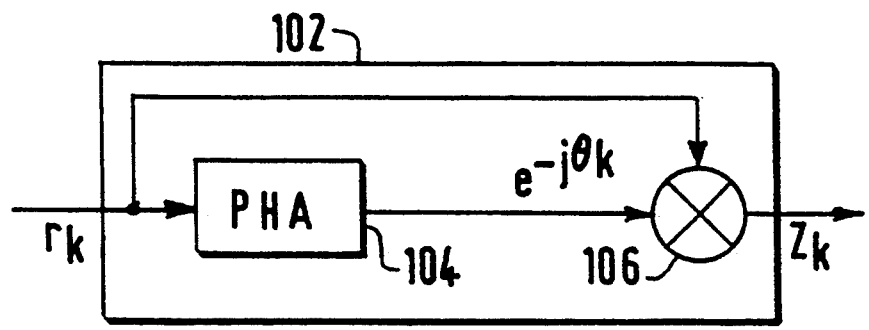
FIG.2
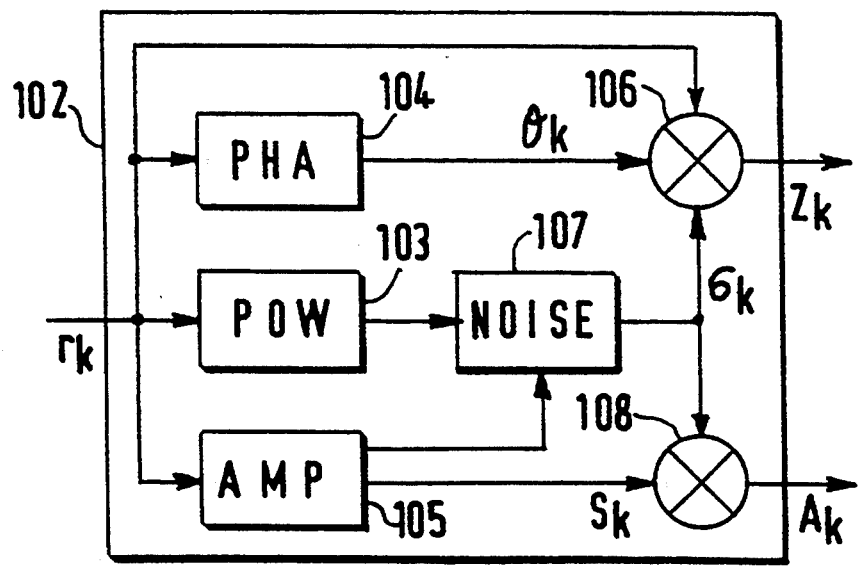
FIG.3
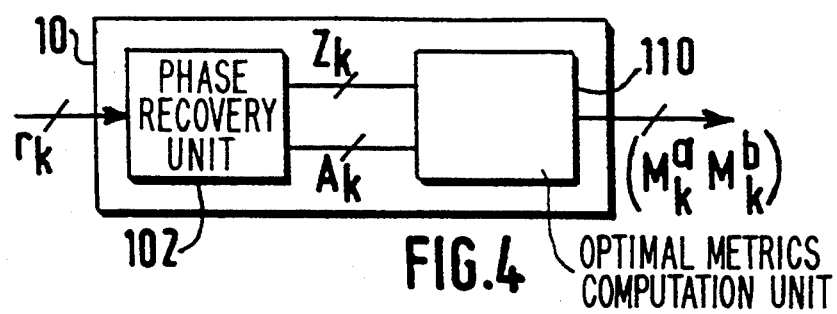
FIG.4 OPTIMAL METRICS COMPUTATION UNIT

1

RECEIVER FOR DIGITAL SIGNALS TRANSMITTED IN THE CODED DIFFERENTIAL MODULATION MODE

BACKGROUND OF THE INVENTION

The invention relates to a receiver for digital signals which have successively undergone, on transmission, a channel coding and a differential coding and which resulting coded digital signals have been assigned to symbols of a constellation, the receiver comprising differential decoding means which calculate metrics in response to received symbols, and channel decoding means for producing decoded digital signals in response to the calculated metrics.

Communication techniques for transmission through the air or by cable use a modulation of one or various carriers by means of digitally coded symbols. Among these techniques one preferably uses a differential modulation for which the phase of a transmit symbol is coded relative to the phase of the symbol prior to transmission. This presents the advantage to decode received symbols on reception by determining phase differences between the symbols. The binary data to be transmitted generally undergo various processes intended to ensure a transmission reliability under generally disturbed transmitting conditions. Among them a convolution coding is often carried out followed by a time-division/-frequency-division interleaving of the symbols. Alternatively, a block coding may be carried out.

Such a process is described in the document FR-A-2 639 495 in the case of an application to a multicarrier transmission. Considering in this document only the aspect relating to this invention, there is indicated that at the receiver end a differential demodulation takes place of received symbols which is followed by a time-division/frequency-division deinterleaving of the symbols and a maximum likelihood decoding called Viterbi decoding.

The differential demodulation described consists of generating, in response to a series of received symbols $r_0, r_1 \ldots r_N$, a series $r'_1 \ldots r'_N$, so that $r'_k = r_k r_{k-1}^*$ where $r_{k-1}^*$ designates the complex conjugate of $r_{k-1}$ and k designates a current index.

For each received symbol $r_k$, based on the series $r'_1 \ldots r'_N$, a real part $Re(r'_k)$ is determined which is a metric with which is associated a coded information bit and also an imaginary part $Im(r'_k)$ is determined which is a metric with which another coded information bit is associated. The metric sequences thus formed thereafter undergo a deinterleaving followed by a convolution decoding which restores the bits of initial information. In the case of convolution coding a Viterbi decoder is used.

But these metrics are approximated metrics which provides that the decoding does not produce an optimum result.

SUMMARY OF THE INVENTION

One of the objects of the invention is to improve the performance of a receiver which utilizes such symbol decoding mechanisms.

This object is achieved with a receiver in which the differential decoding means comprise first means for estimating for each received symbol a rotation phase which the constellation undergoes and for restoring said received symbol to its original phase, and second means for calculating optimum metrics in response to received symbols that have been restored to their original phase.

By determining for each symbol its original phase and optimum metrics, an optimum result will thus be obtained at the output of the convolution decoder. Thus, the invention provides a substantial enhancement of the performance.

To enhance the performance even more, in a particular embodiment a mean noise level is established appearing over various symbols which were transmitted prior to the symbol during the decoding. This may relate to symbols transmitted before and after the symbol during the decoding if there are delay means for delaying the decoding of the current symbol. Therefore, the receiver comprises calculating means for calculating a mean noise level while the modulus of the current symbol is normalized relative to the mean noise. For the subsequent calculation of optimum metrics it is possible to calculate, in addition, a mean amplitude determined over a series of symbols and to normalize this mean amplitude relative to the mean noise.

The measures relating to the original phase of each symbol, to the symbols normalized relative to the mean noise and to the mean symbol amplitudes can be obtained by suitably programming a computer or by dedicated units. The calculating means for calculating the optimum metrics may comprise a memory storing precalculated metrics. The memory is then addressed by a real part and an imaginary part of the symbols restored to their original phase.

The invention may be implemented as well with monocarrier modulations as with multicarrier modulations, for example, orthogonal frequency-division multiplex (OFDM) multicarrier modulations.

These various aspects of the invention and still other aspects will become apparent and be explained on the basis of the embodiments to be described hereinafter.

BRIEF DESCRIPTION OF THE DRAWINGS

The invention will be better understood with the aid of the following Figures to be given by way of non-limiting example, which represent in:

FIG. 1: a block schematic diagram of a receiver for a differential decoding with deinterleaving and convolution decoding.

FIG. 2: a diagram of restoring means for restoring a received symbol to its original phase.

FIG. 3: a diagram of restoring means for restoring a received symbol to its original phase and means for determining a mean noise level and a mean amplitude and for normalizing the modulus of the symbol relative to noise.

FIG. 4: a diagram of the differential decoding means.

DETAILED DESCRIPTION OF THE PREFERRED EMBODIMENTS OF THE INVENTION

The invention will be described hereinafter in the preferred case where there is interleaving and deinterleaving respectively, at the transmitting and receiving ends. In certain situations these processes cannot occur.

FIG. 1 shows a receiver 5 comprising a differential decoding unit 10 DIFF DECOD, a deinterleaver 12 ENT$^{-1}$ and a convolution decoder 14 CONV DECOD. The differential decoding unit 10 receives symbols $r_k$ and produces metrics (bus 11). These metrics undergo a time-division/frequency-division deinterleaving process to produce deinterleaved metrics (bus 13) which are decoded by the decoder 14 to form a decoded bit string B.

According to the invention, the differential decoding unit 10 produces optimum metrics $M_k^a$ and $M_k^b$ which are substituted by $\text{Re}(r'_k)$ and $\text{Im}(r'_k)$ respectively. This makes it necessary to know the original phase of the received symbols contrary to the prior art where only the phase difference between two consecutive symbols has been taken into consideration. The unit 10 thus comprises (FIG. 4) a phase calculation/correction unit 102 for the received symbols and a calculation unit 110 for calculating the optimum metrics.

Unit 102 is a phase-locked loop (FIG. 2). The unit produces received symbols $z_k$ whose phase has been readjusted. In an embodiment the unit comprises a phase estimator 104 and a multiplier 106 which restore the received symbol to its original phase with:

$$z_k = r_k e^{-j\theta_k} \quad (1)$$

where $\theta_k$ corresponds to the phase rotation of the constellation. By way of example, let us consider the case of a phase estimation for symbols transmitted according to a DAB standard (Digital Audio Broadcasting). In this case the differential modulation, on transmission, is equivalent to carrying out a differential coding followed by an assigning of coded bits to symbols of a QPSK constellation and then turning this constellation by $\pi/4$. In this case unit 104 calculates for each symbol an estimate $\theta_k$ of the phase rotation by the recurring formula:

$$\theta_k = \pi/4 + \theta_{k-1} + \lambda \cdot \alpha_k \quad (2)$$

where $\alpha_k$ is the phase of the symbol $r_k \cdot e^{-j(\theta_{k-1} + \pi/4)}$ restored at interval $[-\pi 4, \pi/4]$ by a modulo $-\pi/2$, and $\lambda$ is a convergence factor.

When the channel is subjected to fluctuations which cause the channel noise to fluctuate as well, the phase restoration unit 102 can carry out a noise measurement which is characterized by its variance $\sigma$ and/or also a measurement of a mean amplitude S of the signal determined over a series of received symbols. In this case, unit 102 produces an estimate $A_k$ of the mean amplitude $S_k$ measured during the reception of the symbol $r_k$, the amplitude $S_k$ being normalized relative to noise with:

$$A_k = S_k / \sigma_k \quad (3)$$

(FIG. 3), and unit 102 takes into consideration the calculation of noise to normalize the phase readjusted received symbol $z_k$, so that:

$$z_k = r_k e^{-j\theta_k} / \sigma_k \quad (4)$$

To measure a mean noise level, unit 102 comprises a unit 105 AMP for measuring the mean amplitude $S_k$ and a unit 103 POW to measure the power of the signal. The mean amplitudes and the power levels measured by the units 105 and 103 respectively, are used for calculating a mean noise level in a noise measuring unit 107 NOISE. This mean level is calculated over an recurrent series of various symbols. Unit 107 produces a measurement of the noise variance $\sigma_k$. A mixer 108 receives $\sigma_k$ and $S_k$ and then produces the amplitude $A_k$ normalized relative to noise, so that $A_k = S_k / \pi_k$. Differential decoding unit 10 cannot determine a normalized mean amplitude relative to noise, in which case the mixer 108 does not occur.

$z_k$ and possibly $A_k$ can also be determined by a unit 102 which comprises a suitably programmed computer to carry out the calculations of at least one of the equations (1) (2) (3) (4).

The symbols $z_k$ and the normalized mean amplitudes $A_k$ are then used by a unit 110 for calculating the metrics. Differential decoding unit 10 (FIG. 4) also comprises unit 102 and unit 110 for calculating the metrics ($M_k^a$, $M_k^b$).

A metric is associated with a transmitted bit. In the case of a QPSK modulation with Gray coding and differential coding, a bit $e_k^a$ was associated with $\text{Re}(r'_k)$ and another bit $e_k^b$ was associated with $\text{Im}(r'_k)$ within the scope of the prior art. Within the scope of the invention, $e_k^a$ is associated with $M_k^a$ and $e_k^b$ with $M_k^b$. The metric $M_k^a$ is defined as the algorithm of the ratio between the receiving probability $z_{k-1}$ and $z_k$ knowing that $e_k^a$ is equal to 1, and the receiving probability $z_{k-1}$ and $z_k$ knowing that $e_k^a$ is equal to 0:

$$M_k^a = \log\left( \frac{P(z_k, z_{k-1} | e_k^a = 1)}{P(z_k, z_{k-1} | e_k^a = 0)} \right) \quad (5)$$

$M_k^b$ is defined by analogy.

The calculation shows that this metric, in view of the considered modulation, has for its value $$M_k^a = \log\left( \sum_{n=0}^{3} [C(k,n,0) + C(k,n,1)] \right) - \log\left( \sum_{n=0}^{3} [C(k,n,2) + C(k,n,3)] \right) \quad (6)$$

$$M_k^b = \log\left( \sum_{n=0}^{3} [C(k,n,0) + C(k,n,3)] \right) - \log\left( \sum_{n=0}^{3} [C(k,n,2) + C(k,n,1)] \right)$$

with:

$$C(k,n,p) = \exp\left( -\frac{1}{2} \left( \left| z_{k-1} - A e^{i(n\frac{\pi}{2} + \frac{\pi}{4})} \right|^2 + \left| z_k - A e^{i(n\frac{\pi}{2} + \frac{\pi}{4} + p\frac{\pi}{2})} \right|^2 \right) \right) \quad (7)$$

In the case where a mean amplitude $A_k$ is not produced by unit 102, a constant value is assigned to this unit and the same formula is applied.

In the complete version of the system, unit 110 receives for each symbol $r_k$ the imaginary part $\text{Im}(z_k)$ and real part $\text{Re}(z_k)$ of the symbol $z_k$ which has undergone a phase correction and is normalized relative to noise, and receives the mean amplitude value $A_k$ normalized relative to noise.

Unit 110 is then to calculate the optimum metrics.

In a first embodiment the metric is calculated by a signal processor. The calculation algorithm will be detailed hereinafter for the example corresponding to the DAB standard.

The algorithm utilizes one Table u having 2×4 elements, one Table c having 4×4 elements, and two Tables a and b having 4 elements defined by: a[0]=1, a[1]=0, a[2]=0, a[3]=1, b[0]=1, b[1]=1, b[2]=0, b[3]=0.

On reception of the first symbol, the processor calculates the values:

$$u[0,0] = \exp\left(\frac{1}{2}(Re(z_0) - A/\sqrt{2})^2\right)$$

$$u[1,0] = \exp\left(\frac{1}{2}(Re(z_0) + A/\sqrt{2})^2\right)$$

$$u[0,1] = \exp\left(\frac{1}{2}(Im(z_0) - A/\sqrt{2})^2\right)$$

$$u[1,1] = \exp\left(\frac{1}{2}(Im(z_0) + A/\sqrt{2})^2\right)$$

Then, with each received symbol $z_k$, the processor performs the five following operations:

step 1: calculation of:

$$u[0,2] = \exp\left(\frac{1}{2}(Re(z_k) - A/\sqrt{2})^2\right)$$

$$u[1,2] = \exp\left(\frac{1}{2}(Re(z_k) + A/\sqrt{2})^2\right)$$

$$u[0,3] = \exp\left(\frac{1}{2}(Im(z_k) - A/\sqrt{2})^2\right)$$

$$u[1,3] = \exp\left(\frac{1}{2}(Im(z_k) + A/\sqrt{2})^2\right)$$

step 2: calculation of the values of the Table c for the indices i and j varying from 0 to 3, $c[i,j] = u[a[i],0] \times u[b[i],1] \times u[a[j],2] \times u[b[j],3]$ step 3: calculation of the following numbers:
$F^a = \Sigma_{n=0}^{3} (c[n,n] + c[n,(n+1) \bmod 4])$
$G^a = \Sigma_{n=0}^{3} (c[n,(n+2) \bmod 4] + c[n,(n+3) \bmod 4])$
$F^b = \Sigma_{n=0}^{3} (c[n,n] + c[n,(n+3) \bmod 4])$
$G^b = \Sigma_{n=0}^{3} (c[n,(n+2) \bmod 4] + c[n,(n+1) \bmod 4])$
step 4: calculation of the metrics:
$M^a = \log(F^a/G^a)$
$M^b = \log(F^b/G^b)$
step 5: copying of u(.,2) in u(.,0) and u(.,3) in u(.,1) where the point (.) in the Table is used to connote each index of the Table.

In another particular embodiment for the metric calculation unit 110 this unit is formed by a memory in which the precalculated metrics have been stored in advance.

With each received symbol an integer is generated in the following manner: the values $R_e(Z_{k-1})$, $I_m(Z_{k-1})$, $R_e(z_k)$, $I_m(z_k)$, $A_k$ are quantized in a limited number of bits and then concatenated. A quantization interval for each of these five real numbers corresponds to each value of the integer thus obtained. Each integer constitutes a memory address at which a precalculated value of the two metrics $M^a$ and $M^b$ is stored. This value is calculated according to equation (6) in which $A_k$ is replaced by a typical value in the quantization interval, and the exponential functions are replaced by their integrals for the quantization intervals $R_e(z_{k-1})$, $I_m(z_{k-1})$, $R_e(z_k)$, $I_m(z_k)$.

The current integer generated after quantization and concatenation is used to address the memory and obtain on the data bus the concatenated values of the metrics.

In the case of signals which are in conformity with the DAB standard, the invention yields a gain of 1.2 dB relative to conventional techniques for convolution codes which have an efficiency of ½ between the incoming data flow and the outgoing data flow. This gain may reach 2.3 dB for convolution codes having a better efficiency.

I claim:

1. Receiver for digital signals which have successively undergone, on transmission, a channel coding and a differential coding and which resulting coded digital signals have been assigned to symbols of a constellation, the receiver comprising differential decoding means which calculate metrics in response to received symbols, and channel decoding means for producing decoded digital signals in response to the calculated metrics, wherein the differential decoding means comprise first means for estimating for each received symbol a rotation phase which the constellation undergoes and for restoring said received symbol to its original phase, second means for calculating optimum metrics in response to received symbols that have been restored to their original phase, and third means for calculating a mean noise output which influences the symbols and for normalizing each received symbol relative to the mean noise.

2. Receiver as claimed in claim 1, wherein the first means and/or the second means and/or the third means comprise a suitably programmed computer.

3. Receiver as claimed in claim 1, wherein the resulting coded digital symbols have been transmitted either on a monocarrier or on multicarriers and the receiver comprises differential decoding means for the monocarrier or for multicarriers.

4. Receiver as claimed in claim 1, wherein the differential decoding means comprise fourth means for measuring over various symbols a mean amplitude which is normalized relative to the mean noise and for calculating said optimum metrics on the basis of said restored symbols and the normalized mean amplitudes.

5. Receiver as claimed in claim 4, wherein the first means and/or the second means and/or the third means and/or the fourth means comprise a suitably programmed computer.

6. Receiver as claimed in claim 1, wherein the second means comprise a memory in which precalculated metrics are stored.

7. Receiver as claimed in claim 2, wherein the second means comprise a memory in which precalculated metrics are stored.

8. Receiver as claimed in claim 2, wherein the resulting coded digital symbols have been transmitted either on a monocarrier or on multicarriers and the receiver comprises differential decoding means for the monocarrier or for multicarriers.

9. Receiver as claimed in claim 7, wherein the resulting coded digital symbols have been transmitted either on a monocarrier or on multicarriers and the receiver comprises differential decoding means for the monocarrier or for multicarriers.

10. Receiver for digital signals which have successively undergone, on transmission, a channel coding and a differential coding and which resulting coded digital signals have been assigned to symbols of a constellation, the receiver comprising differential decoding means which calculate metrics in response to received symbols, and channel decoding means for producing decoded digital signals in response to the calculated metrics, wherein the differential decoding means comprise first means for estimating for each received symbol a rotation phase which the constellation undergoes and for restoring said received symbol to its original phase, second means for calculating optimum metrics in response to received symbols that have been restored to their original phase, and third means for measuring over various symbols a mean amplitude which is normalized relative to the mean noise and for calculating said optimum metrics on the basis of said restored symbols and the normalized mean amplitudes.

11. Receiver as claimed in claim 10, wherein the first means and/or the second means and/or the third means comprise a suitably programmed computer.

12. Receiver as claimed in claim 10, wherein the second means comprise a memory in which precalculated metrics are stored.

13. Receiver as claimed in claim 10, wherein the resulting coded digital symbols have been transmitted either on a monocarrier or on multicarriers and the receiver comprises differential decoding means for the monocarrier or for multicarriers.

14. Receiver for digital signals which have successively undergone, on transmission, a channel coding and a differential coding and which resulting coded digital signals have been assigned to symbols of a constellation, the receiver comprising differential decoding means which calculate metrics in response to received symbols, and channel decoding means for producing decoded digital signals in response to the calculated metrics, wherein the differential decoding means comprise first means for estimating for each received symbol a rotation phase which the constellation undergoes and for restoring said received symbol to its original phase, second means for calculating optimum metrics in response to received symbols that have been restored to their original phase, wherein the second means comprise a memory in which precalculated metrics are stored.

15. Receiver as claimed in claim 14, wherein the resulting coded digital symbols have been transmitted either on a monocarrier or on multicarriers and the receiver comprises differential decoding means for the monocarrier or for multicarriers.

* * * * *